United States Patent [19]

Nakamura et al.

[11] Patent Number: 5,608,546
[45] Date of Patent: Mar. 4, 1997

[54] DATA COMMUNICATIONS APPARATUS HAVING A COMPUTER MODEM FUNCTION

[75] Inventors: Mitsuhiro Nakamura; Kohichi Shibata, both of Osaka, Japan

[73] Assignee: Mita Industrial Co., Ltd., Osaka, Japan

[21] Appl. No.: 398,783

[22] Filed: Mar. 6, 1995

[30] Foreign Application Priority Data

Mar. 11, 1994 [JP] Japan .................................. 6-041200
Mar. 11, 1994 [JP] Japan .................................. 6-041201
Mar. 15, 1994 [JP] Japan .................................. 6-043456

[51] Int. Cl.⁶ ........................................ H04N 1/32
[52] U.S. Cl. ..................... 358/468; 358/442; 379/100
[58] Field of Search ............................. 358/434–437, 358/442, 468, 400; 379/93, 100; 348/730; H04N 1/32

[56] References Cited

U.S. PATENT DOCUMENTS

| | | |
|---|---|---|
| 4,652,933 | 3/1987 | Koshiishi. |
| 4,802,204 | 1/1989 | Chang ................................. 358/400 |
| 4,991,200 | 2/1991 | Lin ..................................... 358/468 |
| 5,194,968 | 3/1993 | Nakajima et al. ................... 358/434 |
| 5,392,023 | 2/1995 | D'Avello et al. ................... 358/400 |

*Primary Examiner*—Kim Vu
*Attorney, Agent, or Firm*—Beveridge, DeGrandi, Weilacher & Young, LLP

[57] ABSTRACT

In a facsimile apparatus provided with a facsimile modem function through which a personal computer performs communication, the changeover between a facsimile mode and a facsimile modem mode is made based on the setting and activation conditions of the apparatus. When a call comes in while the facsimile apparatus is in the facsimile modem mode, if no power is supplied to the personal computer, the operation mode is changed to the facsimile mode to receive the call. When the personal computer does not respond to a call notification although power is supplied thereto, a warning sound is provided. A call coming in when the facsimile apparatus is used as an image data inputting and outputting apparatus of the personal computer is ignored. The facsimile apparatus does not respond to an AT command received within a predetermined period of time after the setting of an original to be transmitted, so that the facsimile mode is maintained.

13 Claims, 8 Drawing Sheets

'94-02-14 (MON) 12:00
SET DOCUMENT

FIG. 8B

'94-02-14 (MON) 12:00
RS-232 MODE

FIG. 8C

RS-232 MODE
COMMUNICATING

DATA COMMUNICATIONS APPARATUS HAVING A COMPUTER MODEM FUNCTION

BACKGROUND OF THE INVENTION

1. Field of the Invention

The present invention relates to a data communications apparatus which performs data communications through the telephone line and that is connected to an external information processor such as a personal computer for the external information processor to perform communications through the data communications apparatus, and more specifically, to a facsimile apparatus provided with a facsimile modem function.

2. Description of the Prior Art

A function to directly facsimile-transmit an original such as a document and a drawing made on a personal computer and to receive image data facsimile-transmitted over the telephone line to directly input them to the personal computer is called a PC-FAX function. The PC-FAX function is realized by connecting a personal computer to a facsimile apparatus having a data communications port such as an RS-232C port to use the facsimile apparatus as a facsimile modem.

In connecting a personal computer to a facsimile apparatus, an expansion board provided with an internal register is connected to, for example, an RS-232C port of the facsimile apparatus. The personal computer is connected to the facsimile apparatus through the expansion board, and the expanded function is allotted to a key of an operation unit of the facsimile apparatus.

By attaching the expansion board, various expanded functions are performed such as a function for the personal computer to transmit data via the facsimile apparatus, a function for the personal computer to receive data via the facsimile apparatus, a printing function to use the facsimile apparatus as a printer of the personal computer, and a scanner function to use the facsimile apparatus as a scanner for inputting images to the personal computer. Thus, a recording unit and an original reading unit of the facsimile apparatus can be used also as a printer and a scanner which are necessarily prepared on the side of the personal computer originally, so that it is unnecessary to prepare the expensive peripheral devices, which is very advantageous.

A facsimile apparatus connected to a personal computer operates in two modes: a normal mode (facsimile mode) in which the facsimile apparatus operates alone without performing any data communications with the personal computer; and a PC-FAX mode (facsimile modem mode) in which the facsimile apparatus performs data communications with the personal computer. The changeover between these two modes is made through control from the personal computer by using control commands called AT commands. This changeover is also made manually by operating an operation key provided on the facsimile apparatus.

The reception according to the PC-FAX mode is performed in the following manner: First, the facsimile apparatus set in the PC-FAX mode notifies the personal computer that a call comes in via the outside line. In response to the notification from the facsimile apparatus, the personal computer supplies the facsimile apparatus with an AT command to instruct the facsimile apparatus to receive the call. Receiving the AT command, the facsimile apparatus connects the line and receives the data via the outside line to transmit it to the personal computer.

In a facsimile apparatus operating in the normal mode and in the PC-FAX mode, calls coming in via the outside line cannot be received when the facsimile apparatus is in the PC-FAX mode and the personal computer is supplied with no power. Such a situation occurs, for example, when the user turns off the personal computer after finishing his or her work and when the user forgets to change the operation mode so that the facsimile apparatus is left in the PC-FAX mode. When the user is not at the facsimile apparatus such as in the nighttime, the operation mode cannot be changed to the normal mode when a call comes in, so that the call cannot be received.

Even if the personal computer is provided with power, the same problem is caused if the applications software of the personal computer for performing the PC-FAX function is not activated. The facsimile apparatus set in the PC-FAX mode tries to notify the personal computer that there is an incoming call, but the personal computer does not respond thereto, so that the call cannot be received. No calls can be received until the user notices that the applications software is not activated.

The telephone line is not used while the scanner function and the printing function are executed in the PC-FAX mode. Therefore, a call may come in while these functions are being executed. Conventionally, in such a situation, since data transfer cannot be performed between the facsimile apparatus and the personal computer, reception error occurs although the call is received. Typically, the facsimile apparatus on the transmitting side automatically performs re-dialing when the facsimile apparatus on the receiving side does not receive the call, and provides an error display without performing re-dialing when reception error occurs on the receiving side. The user of the facsimile machine on the transmitting side who is notified of the reception error necessarily performs the transmitting operation again. Since the telephone line is used even when reception error occurs, the user on the transmitting side is charged for the calling.

Further, in the conventional arrangement, if an AT command is transmitted from the personal computer so that the operation mode of the facsimile apparatus is automatically changed to the PC-FAX mode while the facsimile apparatus is performing communication in the normal mode, transmission according to the normal mode cannot be performed. For example, if an AT command is transmitted just before a key is operated to start transmission after an original to be transmitted is set, the user has to wait until the operation according to the PC-FAX mode is finished even when the transmission of the original is urgent.

SUMMARY OF THE INVENTION

An object of the present invention is to solve the above-described problem associated with the mode setting by changing the mode based on the setting and operation conditions of the apparatus in a facsimile apparatus connected to an external information processor such as a personal computer and operating in a facsimile mode and in a facsimile modem mode.

To achieve the above-mentioned object, according to a facsimile apparatus of the present invention, the power supply condition of the external information processor is sensed in the facsimile modem mode, and when a call comes in while no power is supplied to the external information processor, the operation mode is shifted to the facsimile mode to receive the call. When a call comes in while the external information processor is provided with power, the external information processor is notified that there is an incoming call. When there is no response to the notification from the personal computer, a warning sound is provided.

When a call comes in while the facsimile apparatus is used as a scanner or a printer of the external information processor, the call is ignored: the call is not responded to or received.

Further, even if an AT command to instruct the mode change to the facsimile modem mode is transmitted from the external information processor when transmission is performed in the facsimile mode, the mode change to the facsimile modem mode is not made within a predetermined period of time after the setting of an original to maintain the facsimile mode.

When a call comes in while the facsimile apparatus is in the facsimile modem mode, by setting the operation mode based on the power supply condition of the external information processor, the mis-operation by the user is compensated for and the call is received. By providing a warning sound when there is no response to a call notification while the external information processor is supplied with power, the user notices that something is wrong with the setting of the external information processor such as that applications software is not activated, so that the user can correct the setting.

Further, by ignoring a call coming in when the facsimile apparatus is used as an image inputting and outputting means of the external information processor, the inputting and outputting operation of the image data is continued. In this case, since no reception error occurs, the transmitter is not charged for the calling.

In addition, when an AT command is transmitted while transmission is performed in the facsimile mode, the facsimile mode is maintained if the command is received within a predetermined period of time after the setting of an original, so that the user can transmit the original by performing a transmission operation during that period.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
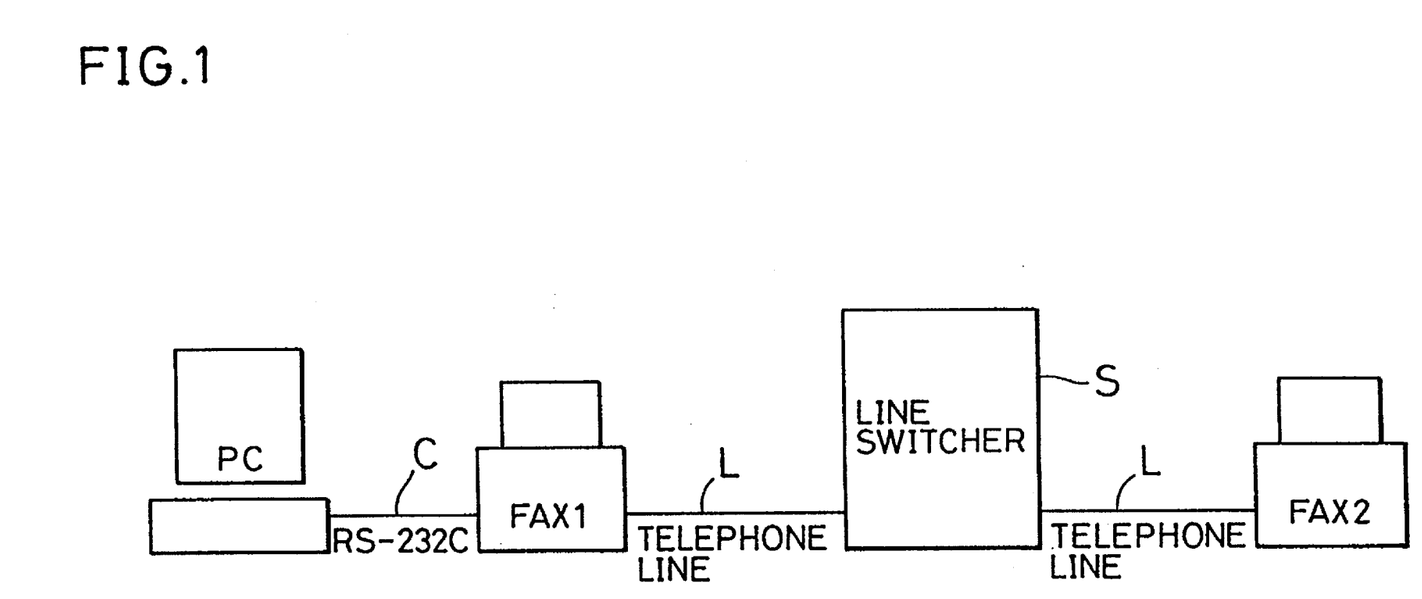
FIG. 1 is a block diagram showing the arrangement of a communications system using a facsimile apparatus of the present invention.

Referring to FIG. 1, there is shown the arrangement of a communications system employing a facsimile apparatus which is a first embodiment of the present invention. A facsimile apparatus FAX1 of the present invention is connected to a facsimile apparatus FAX2 on the other end of the line by a public telephone line L arranged through a line switcher S at a switching office. To the facsimile apparatus FAX1, a personal computer as an external information processor is connected through a data communications cable C such as an RS-232C cable.

Figure 2:
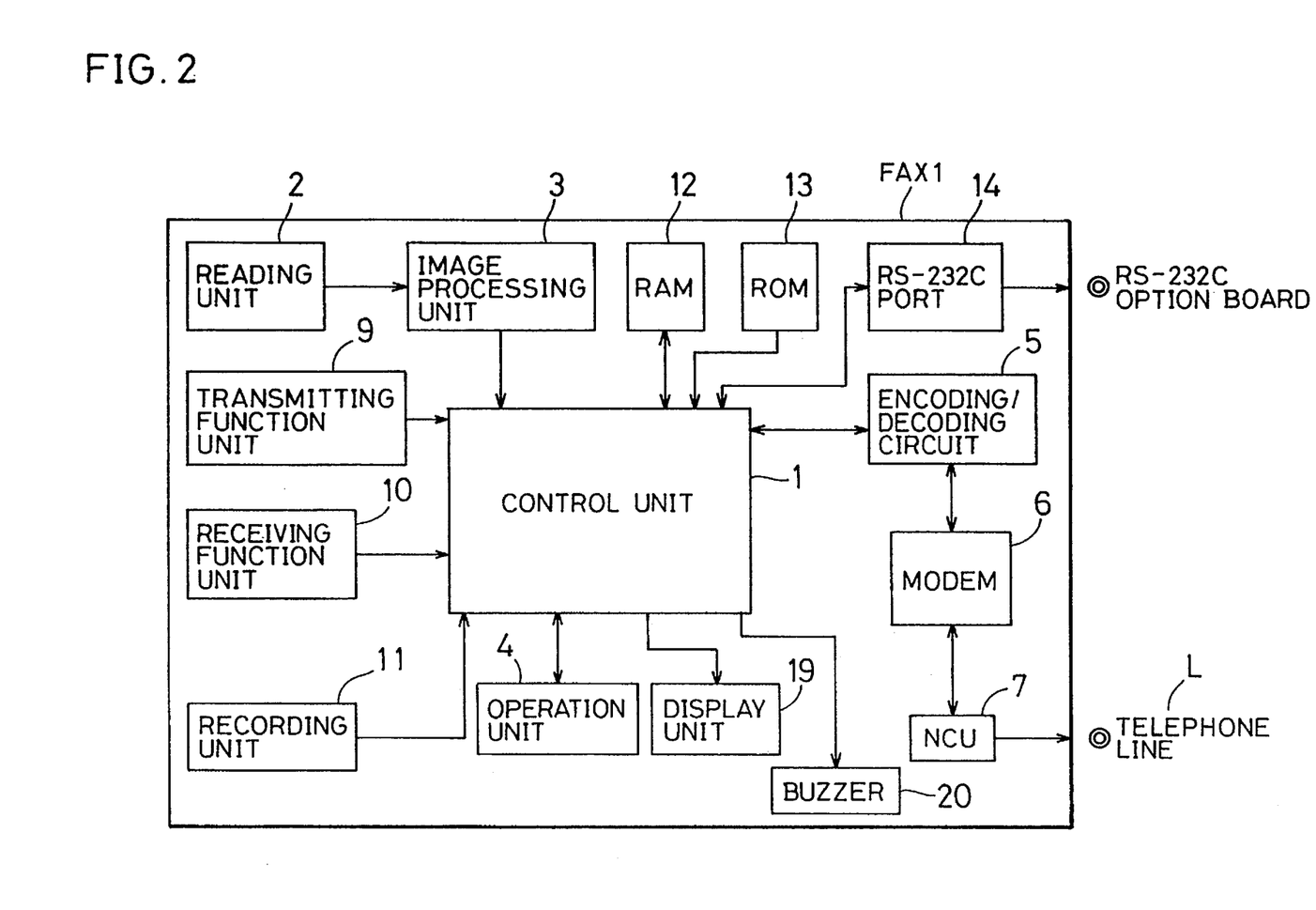
FIG. 2 is a block diagram showing the arrangement of the facsimile apparatus.

Referring to FIG. 2, there is shown a block diagram of the arrangement of the facsimile apparatus FAX1. Reference numeral 1 represents a control unit comprising a microcomputer which controls the entire facsimile apparatus. To the control unit 1, an image data from an image processing unit 3 is supplied. The image processing unit 3 produces image data by performing half-tone processing and other predetermined image processing on an output signal of a reading unit (scanner) 2 which optically reads out an original to be transmitted. Reference numeral 4 represents an operation unit provided with operation keys. Reference numeral 5 represents an encoding/decoding circuit. Reference numeral 6 represents a modem. Reference numeral 7 represents a network control unit (NCU). The control unit 1 is connected to the public telephone line L through the encoding/decoding circuit 5, the modem 6 and the NCU 7.

Reference numeral 9 represents a transmitting function unit which encodes an image data to be transmitted according to a predetermined encoding method and that produces a control signal necessary for facsimile communications. Reference numeral 10 represents a receiving function unit which decodes a received image data and that executes a predetermined reception controlling protocol. Reference numeral 11 represents a recording unit which records a received image on recording paper. Reference numeral 12 represents a random access memory for temporarily storing data. Reference numeral 13 represents a program storing read only memory (ROM). Reference numeral 14 represents an RS-232C port serving as an interface for data communications. The ROM 13 stores parameters for controlling the entire system and stores programs for controlling the RS-232C port 14 and the AT commands and other necessary programs.

Figure 3:
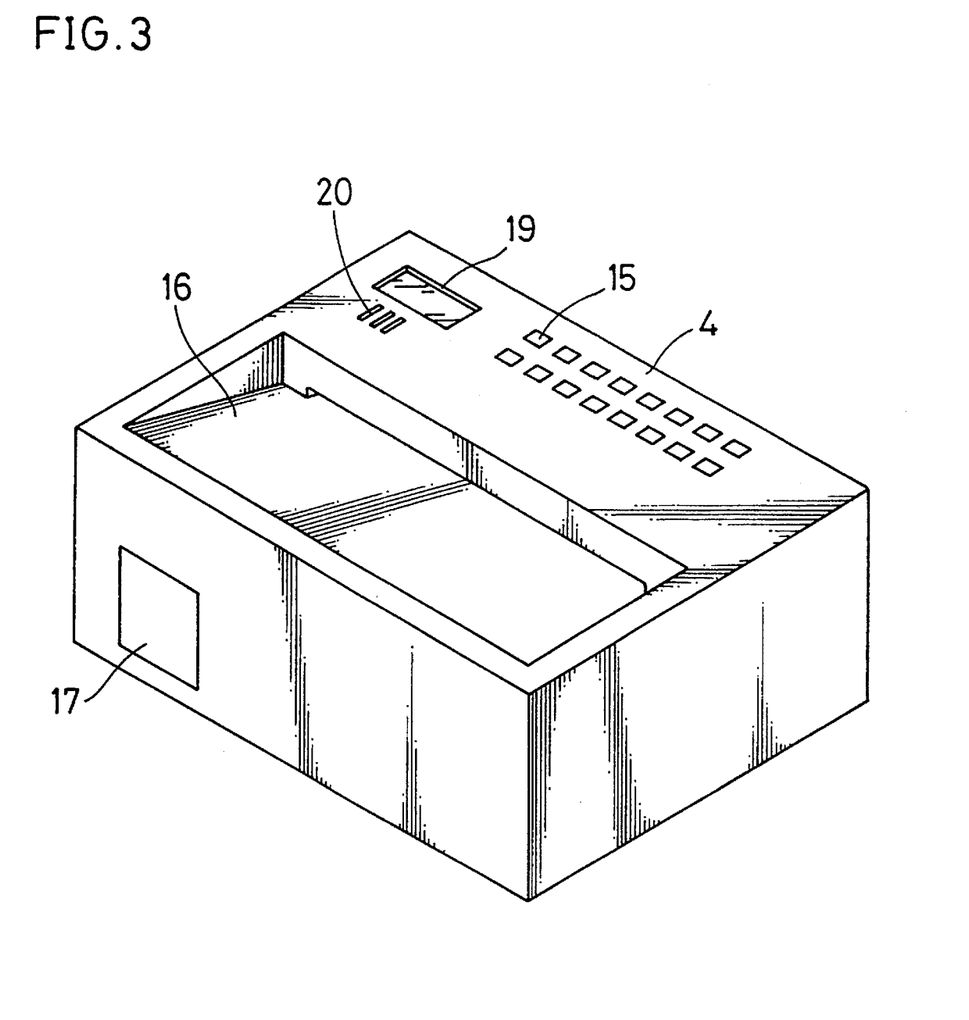
FIG. 3 is a perspective view of the facsimile apparatus.

Referring to FIG. 3, there is schematically shown the appearance of the facsimile apparatus FAX1. On the upper surface, the operation unit 4 including a plurality of keys 15 for inputting telephone numbers and performing various functions, a display unit 19 comprising a liquid crystal display and an original stand 16 for feeding an original to the reading unit 2 are provided. The display unit 19 echo-back-displays the telephone number inputted from the operation unit 4 for confirmation and displays the operation mode of the facsimile apparatus FAX1. On the back surface of the facsimile apparatus FAX1, a window 17 is provided for cable connection with the personal computer PC. On the front surface, although not shown, a sheet discharging slot is formed for discharging a sheet on which an image has been recorded by the recording unit 11. A buzzer 20 is provided for notifying the user of a mis-operation and an abnormal operation.

Figure 4:
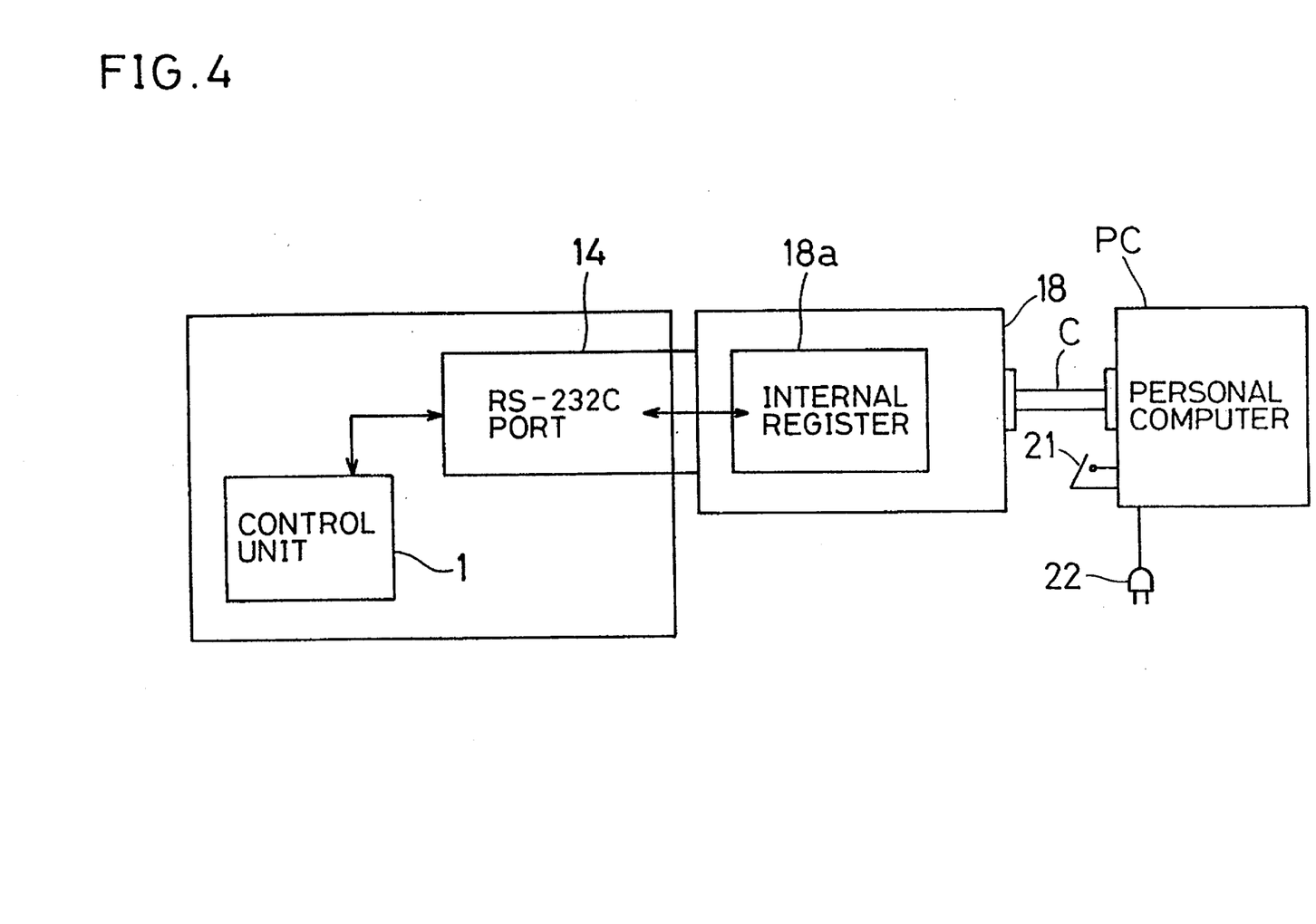
FIG. 4 shows the condition of a connection between the facsimile apparatus and a personal computer.

Referring to FIG. 4, there is shown the condition of a connection between the facsimile apparatus FAX1 and the personal computer PC. To the RS-232C port 14 an expansion board 18 provided with an internal register 18a is connected. To the expansion board 18, the personal computer PC is connected through the RS-232C cable C so that the facsimile apparatus FAX1 can be used as a facsimile modem.

Reference numeral 21 represents a switch for turning on and off the personal computer PC. Reference numeral 22 represents a power connecting plug. An application specific integrated circuit (ASIC) incorporated in the expansion board 18 is provided with a register to see if the personal computer is on or off. The control unit 1 discriminates the activation condition of the personal computer by sensing a signal from the ASIC.

With this arrangement, the facsimile apparatus FAX1 can be controlled from the personal computer by using AT commands, and facsimile transmission and reception can be performed through the facsimile apparatus FAX1. In addition, the facsimile apparatus FAX1 can be used as a printer and a scanner for the personal computer PC.

This realizes the so-called PC-FAX function, and the facsimile apparatus FAX1 operates in the two modes: in the PC-FAX mode to perform data transfer with the personal computer PC; and in the normal mode to operates as a facsimile apparatus without performing data transfer with the personal computer PC. A function to change the operation mode between the facsimile mode and the PC-FAX mode is allotted to a predetermined key of the operation unit 4, and the allocation is stored in the RAM 12. The mode change is made manually by the user by operating the key.

Figure 8A:
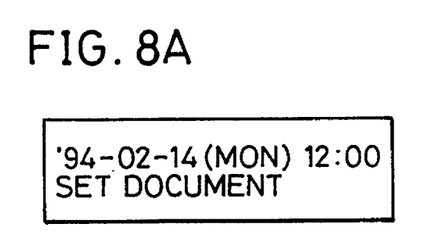
FIG. 8A shows a display provided on a display unit in a facsimile mode.
Figure 8B:
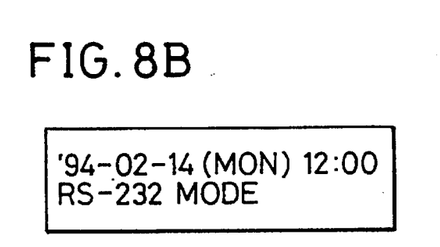
FIG. 8B shows a display provided on the display unit in a standby state in a PC-FAX mode.
Figure 8C:
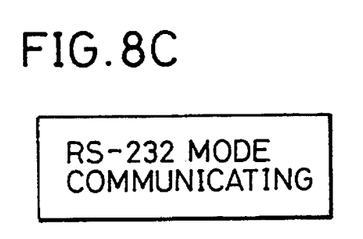
FIG. 8C shows a display provided on the display unit while the facsimile apparatus is in communication with the personal computer according to the PC-FAX mode.

Referring to FIGS. 8A, 8B and 8C, there are shown examples of displays of operation modes on the display 19. The display of FIG. 8A is provided when the facsimile apparatus FAX1 is in the facsimile mode. In addition to the date and time, this display shows that transmission is possible if an original is set. The display of FIG. 8B is provided when the facsimile apparatus FAX1 is in a standby state in the PC-FAX mode. The display of FIG. 8C is provided when the facsimile apparatus FAX1 is in communication with the personal computer PC in the PC-FAX mode.

To execute the scanner function to use the facsimile apparatus FAX1 as a scanner of the personal computer PC, first, the above-mentioned predetermined key of the operation unit 4 is operated when the facsimile apparatus FAX1 is in the facsimile mode to change the mode to the PC-FAX mode. At this time, the display on the display unit 19 is changed from that of FIG. 8A to that of FIG. 8B. Then, an original is set on the original stand 16 and an AT command to start the scanner function is transmitted from the personal computer PC to the facsimile apparatus FAX1. The control unit 1 activates the reading unit 2 to read out the original image. The original image is processed by the image processing unit 3, encoded by the encoding/decoding circuit 5, modulated by the modem 6, and transmitted to the personal computer PC through the RS-232C port 14. At this time, the display of FIG. 8C is provided on the display unit 19.

To execute the printing function to use the facsimile apparatus FAX1 as a printer of the personal computer PC, first, the facsimile apparatus FAX1 is set in the PC-FAX mode by an AT command, and then, an image data is transmitted from the personal computer PC to the facsimile apparatus FAX1. The image data received through the RX-232C port 14 is demodulated by the modem 6, decoded by the encoding/decoding circuit 5 and outputted onto a sheet of paper by the recording unit 11. At this time, the display of FIG. 8C is provided on the display unit 19 to show that the personal computer PC and the facsimile apparatus FAX1 is in communication with each other. When the scanner function and the printing function are used, the telephone line L is not used.

Data transmission and reception with another apparatus according to the PC-FAX function will be described. In data transmission, first, the operation mode of the facsimile apparatus FAX1 is changed from the normal mode to the PC-FAX mode by an AT command. Then, a calling command and a receiver's telephone number are transmitted from the personal computer PC to the RS-232C port 14 through the cable C. The control unit 1 of the facsimile apparatus FAX1 places a call to a terminal on the receiving side through the telephone line L to connect the line. Then, transmission data are successively transmitted from the personal computer PC to the RS-232C port 14 and outputted to the telephone line L by way of the control unit 1, the encoding/decoding circuit 5, the modem 6 and the NCU 7 to perform transmission.

In data reception, an AT command to instruct the facsimile apparatus FAX1 to be in the standby state in the PC-FAX mode is transmitted from the personal computer PC to the facsimile apparatus FAX1 to change the mode from the normal mode to the PC-FAX mode. When a call comes in while the facsimile apparatus FAX1 is in the standby state under this condition, the control unit 1 transmits the reception data to the personal computer PC through the RS-232C port 14. At this time, the reception data is not outputted to the recording unit 11.

Thus, in data transmission and reception in the PC-FAX mode, the facsimile apparatus FAX1 functions as a facsimile modem.

The facsimile apparatus FAX1 of this embodiment performs the reception processing based on the activation condition of the power of the personal computer PC when a call comes in through the outside line while the facsimile apparatus FAX1 is in the PC-FAX mode. If the expansion board 18 recognizes that the personal computer PC is off when a call comes in, the operation mode is automatically changed from the PC-FAX mode to the normal mode to perform facsimile reception, and the operation mode is returned to the PC-FAX mode after the reception. If the expansion board 18 recognizes that the personal computer PC is on when a call comes in, the personal computer PC is called to notify that there is an incoming call, and if the personal computer PC transmits an AT command in response to the calling, reception is performed in the PC-FAX mode. If no AT command is transmitted from the personal computer PC although the personal computer is called, to notify the user that something is wrong with the setting of the personal computer PC, a warning sound is provided by the buzzer 20 and a display to show that something is wrong is provided on the display unit 19.

Figure 5:
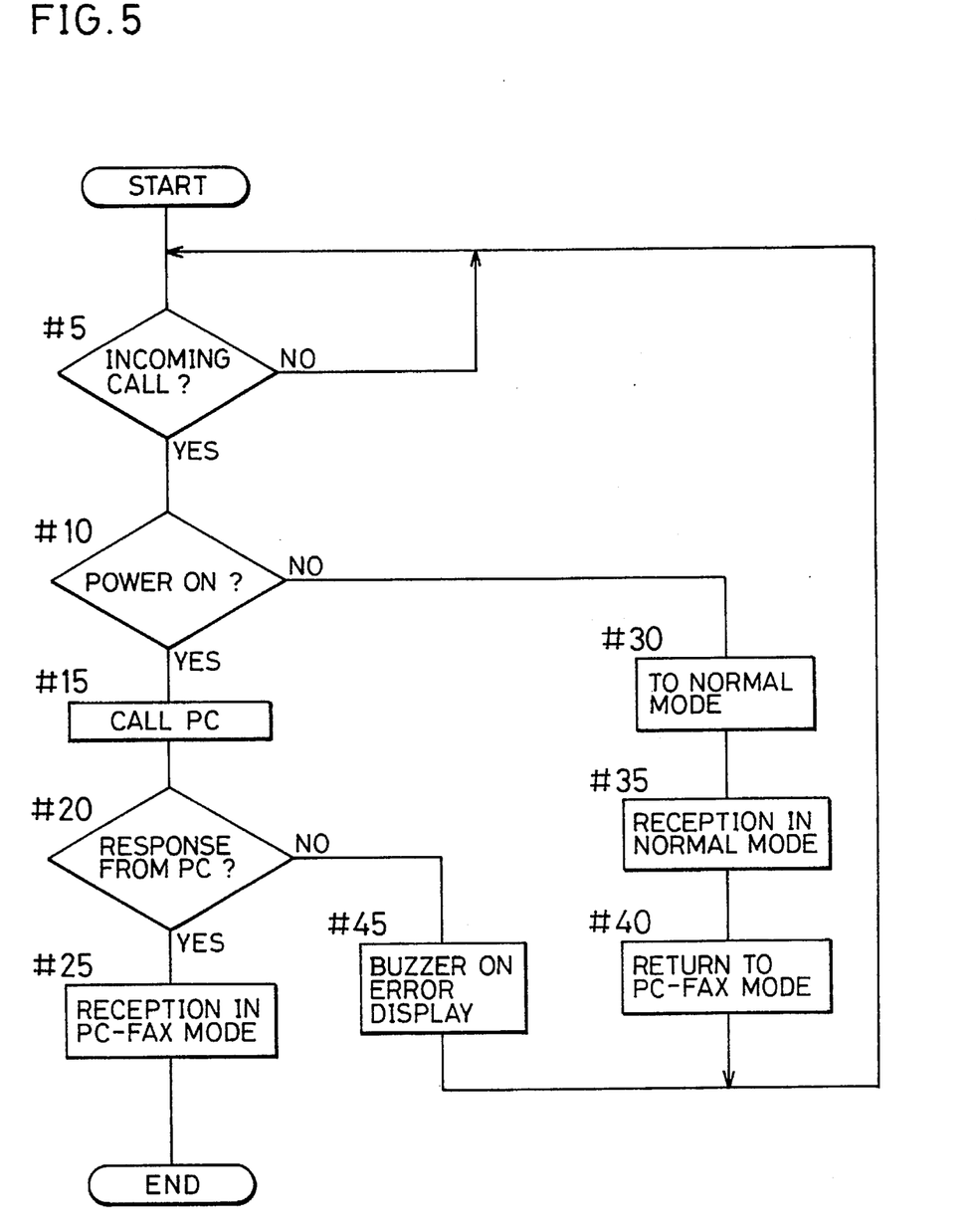
FIG. 5 is the flowchart of a processing performed by a control unit of a facsimile apparatus of a first embodiment.

Referring to FIG. 5, there is shown the flow of a processing performed by the control unit 1 when a call comes in while the facsimile apparatus FAX1 is in the PC-FAX mode. When a call via the outside line is detected at step #5, the activation condition of the personal computer PC is determined based on a signal from the expansion board 18 at step #10. When the personal computer PC is off, the process proceeds to step #30 to set the normal mode and communication data via the outside line are received at step #35. After the reception, the operation mode is returned to the PC-FAX mode at step #40.

When it is determined at step #10 that the personal computer PC is on, the process proceeds to step #15 to call the personal computer PC to notify that there is an incoming call. When it is sensed at step #20 that an AT command is transmitted in response to the calling, at step #25, communication data are received while the facsimile apparatus FAX1 is still in the PC-FAX mode. When there is no response from the personal computer PC, the process proceeds to step #45 to provide a warning to the user by a buzzer and a display.

Since the PC-FAX mode is a mode for a case where the personal computer PC is operable, it is the user's mis-operation to turn off the personal computer PC while the facsimile apparatus FAX1 is still in the PC-FAX mode. However, according to the above-described processing, data via the outside line can be received in the normal mode even if the personal computer PC is turned off while the facsimile apparatus FAX1 is in the PC-FAX mode. Thus, the mis-operation by the user is compensated for. Since the operation mode is automatically returned to the PC-FAX mode after reception is performed in the normal mode, the condition before the personal computer is turned off is restored when the personal computer PC is turned on again, so that it is prevented that a mis-operation again occurs when the user who has no recognition that he or she caused a mis-operation uses the personal computer PC again.

The reason why the personal computer PC does not respond to the calling from the facsimile apparatus FAX1 although it is on is that something is wrong with the setting of the personal computer PC such as that applications software for performing the PC-FAX function is not activated. According to the above-described processing, since a warning is provided to the user by a buzzer and a display, the user notices that something is wrong with the setting of the personal computer PC and can correct the setting, so that reception is surely made when the transmitter re-dials. Since reception is not performed when something is wrong with the setting, the transmitter is not charged for the useless call.

A second embodiment of the present invention will be described. The arrangement of the hardware of this embodiment is the same as that of the first embodiment shown in FIGS. 1 to 4, and the same portions and elements will not be described.

When a call comes in via the outside line while data communication is performed with the personal computer PC by using the scanner or the printing function, the facsimile apparatus FAX1 of this embodiment does not receive the data and continues the scanner or the printing function. Specifically, when the connection to the telephone line L is not made by the NCU 7, the facsimile apparatus FAX1 does not respond to a notification of an incoming call from the line switcher S and causes the transmitter to re-dial.

Figure 6:
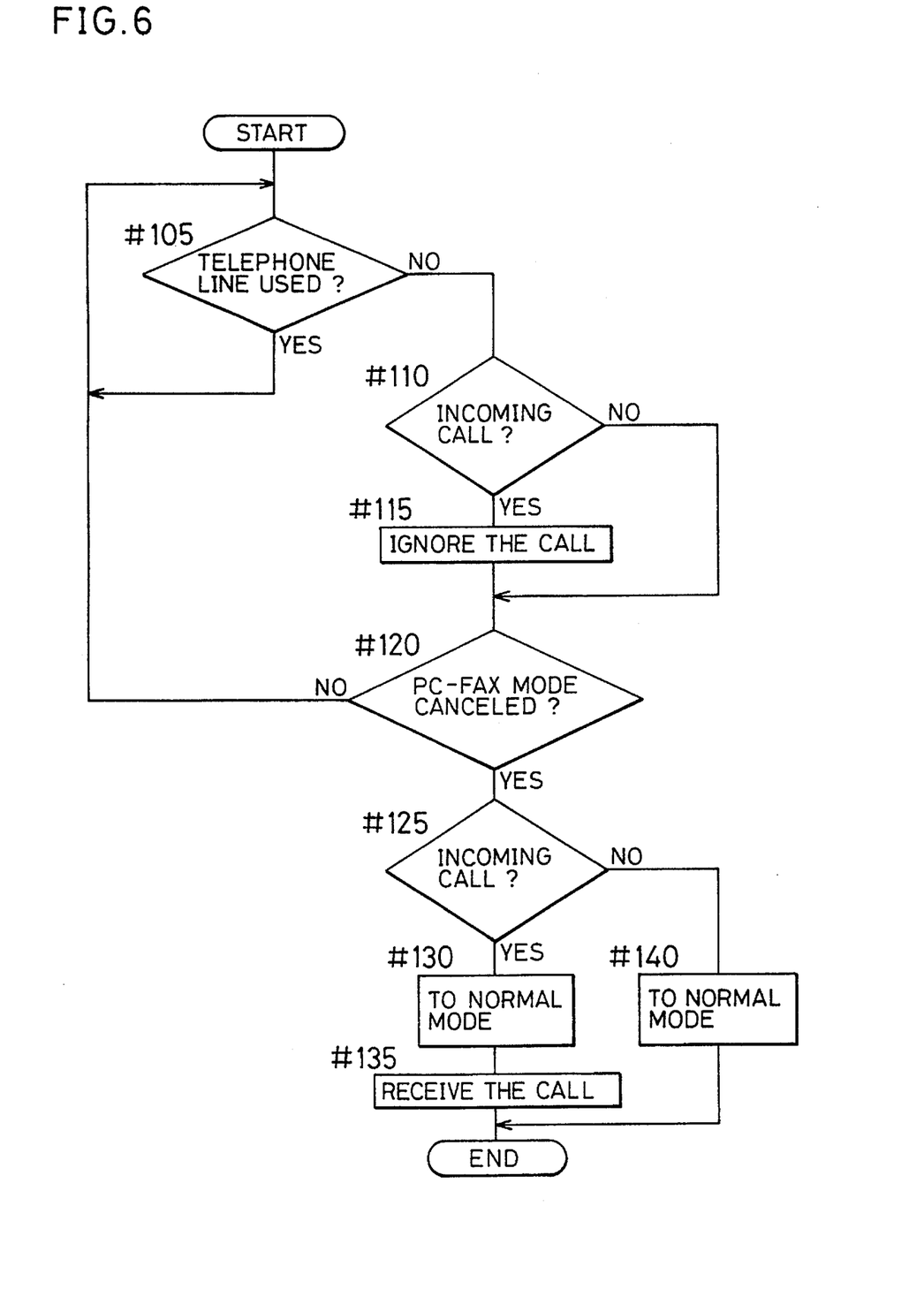
FIG. 6 is the flowchart of a processing performed by a control unit of a facsimile apparatus of a second embodiment.

Referring to FIG. 6, there is shown the flow of a processing performed by the control unit 1 when a call comes in while the scanner of the printing function is executed. When the scanner or the printing function is executed while the facsimile apparatus FAX1 is in the PC-FAX mode, the control unit 1 recognizes that the telephone line L is not used at step #105. When it is recognized at step #110 that a call comes in, for example, from the facsimile apparatus FAX2 of FIG. 1 during this time, the call is not responded to but ignored at step #115. In this case, recognizing that the call is not received, the transmitter typically performs re-dialing.

Then, when it is recognized at step #120 that the scanner or the printing function is finished and that the PC-FAX mode is canceled, if a call again comes in from the transmitter or a call comes in from another facsimile apparatus at step #125, the operation mode is shifted to the normal mode at step #130 and the call is received at step #135. When there is no incoming call, the operation mode is shifted to the normal mode at step #140 so that the facsimile apparatus FAX1 is in the standby state.

According to the above-described processing, the scanner function and the printing function are executed without being prevented by an incoming call via the outside line, and after the operation of the function is finished, reception according to the normal mode immediately becomes possible so that reception can be performed when the transmitter performs re-dialing.

A third embodiment of the present invention will be described. In this embodiment, the arrangement of the hardware is the same as that of the first embodiment shown in FIGS. 1 to 4.

In this embodiment, when an original is set on the original stand 16 while the facsimile apparatus FAX1 is in the normal mode, the facsimile apparatus FAX1 waits for an operation by the user for a predetermined period of time, and when an AT command is transmitted from the personal computer PC during this period, the AT facsimile apparatus FAX1 does not respond to the command so that the operation mode is not shifted to the PC-FAX mode.

Figure 7:
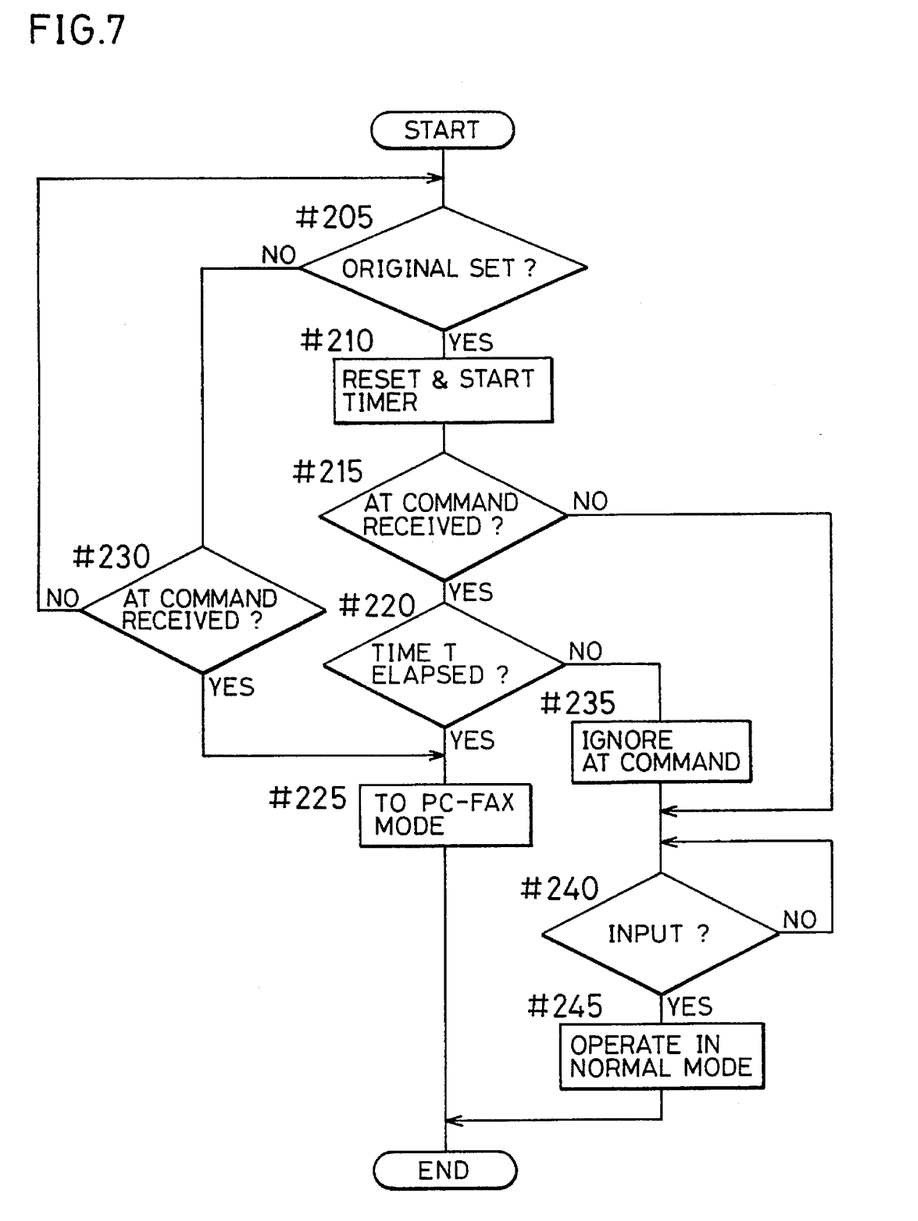
FIG. 7 is the flowchart of a processing performed by a control unit of a facsimile apparatus of a third embodiment.

Referring to FIG. 7, there is shown the flow of a processing performed by the control unit 1. In the normal mode, when it is recognized at step #205 that no original is set on the original stand 16, the process proceeds to step #230 to determine whether an AT command has been received from the personal computer PC or not. When no AT command is received, the process returns to step #205. When an AT command is received, the process proceeds to step #225 to set the PC-FAX mode.

When it is recognized at step #205 that an original is set on the original stand 16, a timer provided in the form of software in the control unit 1 is reset and started at step #210. Then, when the reception of an AT command is recognized before the timer counts a predetermined period of time T at step #215, the process waits for an operation by the user for the predetermined period of time T at step #220. When the user performs no operation according to the normal mode, the PC-FAX mode is set at step #225.

When it is recognized at step #220 that the user performs an operation according to the normal mode before the predetermined period of time T has elapsed, the process proceeds to step #235 to ignore the AT command from the personal computer. When an input by the user is recognized at step #240, the inputted function is executed while the facsimile apparatus FAX1 is still in the normal mode at step #245. When no AT command is received at step #215, the process also proceeds to steps #240 and #245 to perform operations according to the normal mode.

According to the above-described processing, an operation by the user is given priority over an AT command from the personal computer PC within a predetermined period of time after the setting of an original on the original stand, so that facsimile communication can be performed.

Obviously, many modifications and variations of the present invention are possible in light of the above teachings. It is therefore to be understood that within the scope of the appended claims, the invention may be practiced other than as specifically described.

What is claimed is:

1. A data communications apparatus connected to an external information processor and to a telephone line to perform communication through the telephone line, said data communications apparatus having a first communications mode not including data transmission and reception with the external information processor and a second information communications mode including data transmission and reception with the external information processor, wherein controlling means is provided for discriminating a power supply condition of the external information processor, said controlling means changing a communications mode of the data communications apparatus from the second communications mode to the first communications mode when no power is supplied to the external information processor, and wherein said controlling means, upon discriminating that power is supplied to the external information processor, forwards a signal to the external information processor to inform the external information processor that there is an incoming call, and said apparatus further comprising warning means for providing a warning if a response to the signal is not received back from said external information processor.

2. A data communications apparatus according to claim 1 wherein said warning means includes a buzzer and a display unit.

3. A facsimile apparatus connected to an external information processor and having a first mode in which the facsimile apparatus operates as a facsimile machine and a second mode in which the facsimile apparatus operates as a facsimile modem of the external information processor, an operation mode of said facsimile apparatus being shifted from the first mode to the second mode by means for shifting operation modes when the facsimile apparatus receives an AT command from the external information processor, wherein said apparatus includes an original stand for placing an original to be transmitted thereon, and wherein within a preset period of time after a placement of an original on the original stand while the facsimile apparatus is in the first mode, even if the facsimile machine receives an AT command from the external information processor, the operation mode is not shifted to the second mode and the first mode is maintained.

4. A data communications apparatus according to claim 3 wherein, upon an AT command being received following placement of the original and after the predetermined period of time has elapsed, said means for shifting operation modes shifts from the first mode to the second mode.

5. A data communications apparatus connected to an external information processor and to a telephone line to perform communication through the telephone line, said data communications apparatus having a first communications mode not including data transmission and reception with the external information processor and a second communications mode including data transmission and reception with the external information processor, said data communications apparatus comprising:

power supply discriminating means for discriminating a power supply condition of the external information processor;

call notifying means for notifying the external information processor that there is an incoming call when a call comes in through the telephone line while the data communications apparatus is in the second communications mode;

warning means for providing a warning when the external information processor does not respond to a call notification from the call notifying means; and controlling means for activating the call notifying means and the warning means when the power supply discriminating means recognizes that the external information processor is provided with power.

6. A data communications apparatus according to claim 5, wherein the data communications apparatus functions as a facsimile machine in the first communications mode and functions as a facsimile modem in the second communications mode.

7. A data communications apparatus according to claim 5, wherein said data communications apparatus is connected to a personal computer as the external information processor.

8. A data communications apparatus connected to an external information processor and to a telephone line to perform communication through the telephone line, said data communications apparatus having a first communications mode not including data transmission and reception with the external information processor and a second communications mode including data transmission and reception with the external information processor, wherein controlling means is provided for discriminating a power supply condition of the external information processor, said controlling means changing a communications mode of the data communications apparatus from the second communication mode to the first communications mode when no power is supplied to the external information processor, and wherein said controlling means changes the communications mode from the second communications mode to the first communications mode when a call comes in via the telephone line while no power is supplied to the external information processor and changes the communications mode to the second communications mode after the call is received.

9. A data communications apparatus according to claim 8, wherein the data communications apparatus functions as a facsimile machine in the first communications mode and functions as a facsimile modem in the second communications mode.

10. A data communications apparatus according to claim 8, wherein said data communications apparatus is connected to a personal computer as the external information processor.

11. A data communications apparatus according to claim 8 wherein said controlling means discriminates a power supply condition at a time said apparatus is under said second mode.

12. A data communications apparatus according to in claim 11 wherein said controlling means changes the communications mode from the second communications mode to the first communications mode when a call comes in via the telephone line while no power is supplied to the external information processor.

13. A data communications apparatus according to in claim 12, wherein said controlling means changes the communications mode back to the second communications mode after the call is received.

* * * * *